United States Patent [19]

Patey et al.

[11] 4,333,338

[45] Jun. 8, 1982

[54] FUEL PUMP TEST EQUIPMENT

[75] Inventors: Daniel F. Patey; Paul M. Doyle, both of London, England

[73] Assignee: Lucas Industries Limited, Birmingham, England

[21] Appl. No.: 169,782

[22] Filed: Jul. 17, 1980

[30] Foreign Application Priority Data

Sep. 15, 1979 [GB] United Kingdom ................ 7932089

[51] Int. Cl.[3] ........................................ G01M 19/00

[52] U.S. Cl. ................................................ 73/119 A

[58] Field of Search ............ 73/119 A, 168, 3, 861.61

[56] References Cited

U.S. PATENT DOCUMENTS 4,171,638 10/1979 Coman et al. .................... 73/119 A 4,206,634 6/1980 Taylor et al. ..................... 73/119 A

*Primary Examiner*—Jerry W. Myracle

[57] ABSTRACT

A test equipment for testing a fuel pump of the kind intended to supply fuel to a multi-cylinder engine comprises a chamber into which fuel from the outlets of the pump under test can be directed through nozzles respectively. A restricted outlet is provided from the chamber and a pressure transducer is provided to provide a signal indicative of the pressure in the chamber. The equipment also includes a display apparatus which receives the signal from the transducer and an encoder is provided which supplies a signal to the display apparatus indicative of the position of the drive shaft of the pump.

6 Claims, 2 Drawing Figures

FUEL PUMP TEST EQUIPMENT

This invention relates to test equipment for testing a fuel injection pump of the kind which is intended to supply fuel to a multi cylinder internal combustion engine. Where a fuel injection pump supplies, in use, fuel to a multi cylinder engine it is necessary to be able to check that for a given setting of the fuel control member of the pump, each engine cylinder receives substantially the same amount of fuel at each injection stroke. It is also necessary to be able to check that the injection pump supplies the appropriate amount of fuel at various settings of the control member.

A known form of test equipment comprises a motor for driving the pump and a plurality of measuring devices into which fuel discharged from injection nozzles connected to the outlets of the pumps respectively can flow. Since the amount of fuel pumped at each injection stroke is very small it is usual to run the pump so that each injection nozzle discharges fuel say two hundred times during the period of test. The volume of fuel collected is then checked and it is then possible to see whether the delivery of fuel through each injection nozzle is substantially the same. In some injection pumps it is not possible to adjust the amount of fuel flowing through each outlet of the pump and if a discrepancy is found outside prescribed limits, the pump will be rejected. In other pumps it is possible to adjust the relative flows of fuel through the outlets and in such a pump the required adjustment can be effected and then the pump re-tested. It is also necessary to repeat the tests at various settings of the control member of the pump. Each test takes a certain length of time and further time must be allowed to drain the pumped liquid from the measuring devices.

The object of the present invention is to provide a test equipment for the purpose specified in a simple and convenient form.

According to the invention a test equipment for the purpose specified comprises means defining a chamber, a plurality of nozzles having inlets for connection to the outlets of the injection pump respectively, said nozzles being positioned to direct liquid into said chamber, a restricted outlet from said chamber, a pressure transducer for providing a signal indicative of the pressure variation in said chamber as fuel is directed into the chamber from the nozzles in turn, and a display apparatus which receives the signal from said transducer and displays the pressure variations in said chamber.

According to a further feature of the invention a flow meter is provided through which the liquid flowing through said outlet can flow.

An example of a test equipment in accordance with the invention will now be described with reference to the accompanying drawings in which.

Figure 1:
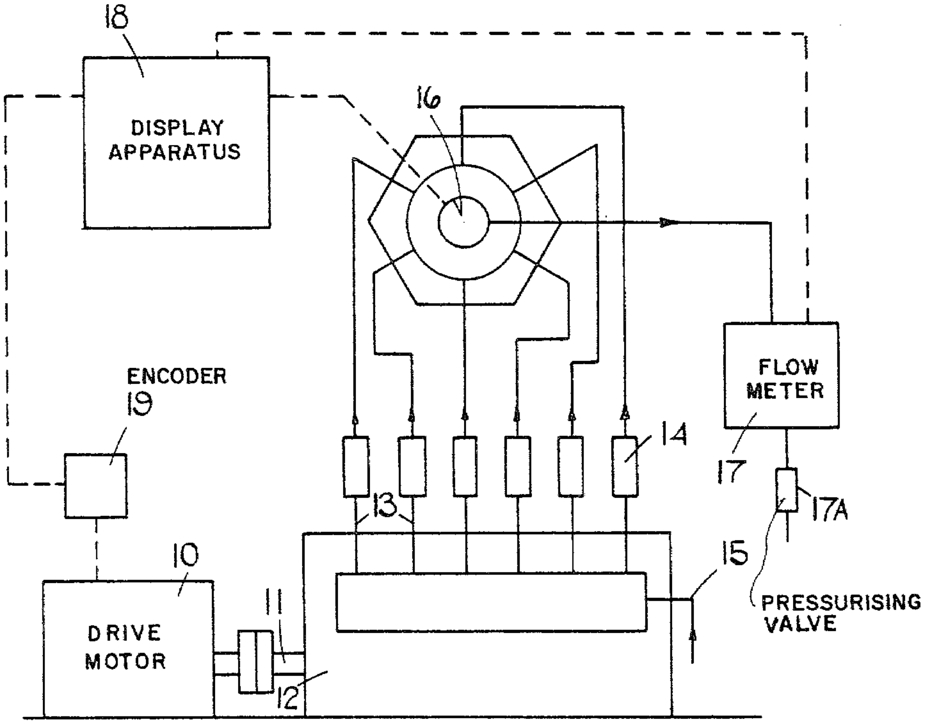
FIG. 1 is a diagrammatic representation of the apparatus.

With reference to FIG. 1 the apparatus includes a drive motor 10 having an output shaft for connection to the input shaft 11 of a fuel injection pump 12 which is to be tested. The form of injection pump illustrated in FIG. 1 is the type in which the outlets 13 of the pump are the outlets respectively of individual injection pumps housed in a commom body and driven by respective cams on the drive shaft of the pump. The outlets are connected to nozzles 14 respectively and a supply of liquid to the injection pump is provided at 15. The liquid may be fuel of the type which would normally be handled by the pump or it may be a special liquid having the same characteristics of fuel but being non-flammable. In FIG. 1 the nozzles 14 are shown removed from a chamber 16 into which they discharge the fuel.

Associated with the chamber 16 is a restricted outlet through which the liquid can flow from the chamber at a restricted rate, the outlet communicating with a flow meter 17. The outlet from the flow meter incorporates a pressurizing valve 17A so that air contained in the fuel will be maintained in solution.

The test equipment also includes a display apparatus 18 which receives a signal from the flow meter and it also receives a signal from a pressure transducer located within the chamber 16. In addition, the display apparatus is provided with a signal from an encoder 19, the signal being representative of the position of the drive shaft of the pump.

Figure 2:
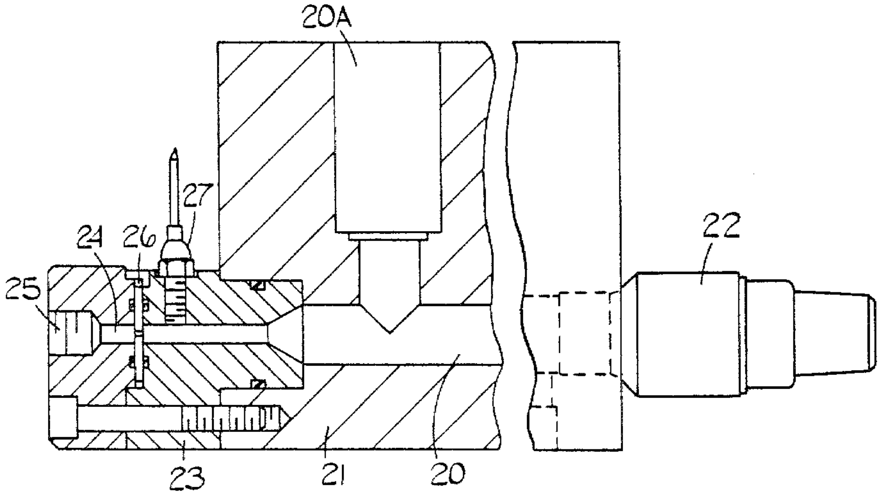
FIG. 2 shows the construction of a part of the apparatus seen in FIG. 1.

Turning now to FIG. 2 the chamber 16 is shown to be formed by a drilling 20 formed in a body 21. Opening into the drilling are branch passages 20A which in use contain the nozzles 14 which may be conventional injection nozzles. At one end of the drilling there is provided a safety valve 22 which opens to permit fuel to escape from the drilling in the event that the pressure of fuel exceeds a predetermined value.

At the other end of the drilling there is provided an adaptor 23 which is secured by bolts to the body 21 and which contains a central passage 24 which terminates in an outlet connection 25. The connection 25 is connected by a pipe line to the flow meter 17. The adaptor 23 is formed in two parts for the purpose of location of an orifice plate 26 in which is formed an orifice through which flows the liquid passing along the passage 24. In addition, the adaptor also mounts a pressure transducer 27, the transducer providing a signal representative of the pressure upstream of the orifice. The transducer 27 is electrically connected to the display apparatus.

In operation when the pump 12 is driven by the motor 10 fuel will be delivered to the chamber 16 through the injection nozzles in turn. Each time fuel is delivered to the chamber an increase in pressure occurs in the chamber and the extent of the increase in pressure for a given speed of the motor depends on the size of the orifice and also the amount of fuel delivered to the chamber. As the amount of fuel delivered to the chamber increases then the peak pressure also increases and vice versa. The size of the orifice in the orifice plate is important. If it is too large then the pressure rise will be small which will mean that there will be a low signal from the transducer and it will be difficult to detect slight differences in the pressure. If the orifice is too small then the pressure within the chamber will not fall to its base value before the next delivery of fuel takes place.

The display apparatus contains a display unit whereby the pressure pulses are displayed together and in sequence. The signal from the encoder 19 is utilised to identify a particular pressure pulse so that the operator will know which nozzle and hence which outlet of the pump is associated with each pulse.

As stated the amplitude of each pulse is an indication of the quantity of fuel delivered and the operator can immediately observe the so called line to line scatter and can if the pump is of the appropriate type, make adjustments to the pump to bring the scatter within the prescribed limits. It must be appreciated that the rise in pressure in the chamber for a given quantity of fuel supplied to the chamber can be varied by altering the volume of the chamber. This can be achieved using adjustable plugs (not shown) which can be screwed into the chamber. This adjustment can be effected while the apparatus is in use.

The flowmeter 17 provides a signal representative of the total fuel flow and this is fed to the display apparatus. The display apparatus includes electronic circuit means which derives from information supplied to it the average amount of fuel delivered at each delivery of fuel by the pump. For this purpose the circuit means requires to know the number of outlets of the pump and the speed at which the pump is driven. This latter information can be obtained from the signal supplied by the encoder whilst the former is pre-programmed by the operator by means of a keyboard. The display apparatus can be arranged to produce a print out of the test results.

The orifice plate 26 is chosen depending upon the range of deliveries expected of the pump and can be readily changed by separating the parts of the adaptor. Each orifice plate of a series supplied with the apparatus has an orifice of differing size and the orifices are preferably of the sharp edged variety.

We claim:

1. A test equipment for use when testing a fuel injection pump of the kind intended to supply fuel to a multi-cylinder internal combustion engine, the test equipment comprising means defining a chamber, a plurality of nozzles having inlets for connection to the outlets of the injection pump respectively, said nozzles being positioned to direct liquid into said chamber, a restricted outlet from said chamber, a pressure transducer for providing a signal indicative of the pressure variation in said chamber as fuel is directed into the chamber from the nozzles in turn, and a display apparatus which receives the signal from said transducer and displays the pressure variations in said chamber.

2. A test equipment according to claim 1 in which said chamber is formed by a drilling extending through a body, and a safety valve located at one end of the drilling, said restricted outlet being located at the other end of the drilling.

3. A test equipment according to claim 2 including an adaptor, means securing the adaptor to said body, a passage extending through the adaptor, said passage communicating with the other end of said drilling, an orifice in said passage, said passage and orifice forming said restricted outlet, said pressure transducer being mounted on said adaptor and communicating with said passage upstream of said orifice.

4. A test equipment according to claim 3 in which said adaptor is formed in two parts and said orifice is formed in a plate adapted to be located between said parts.

5. A test equipment according to claim 4 including a flow meter connected to said passage.

6. A test equipment according to claim 5 including a motor operable in use to drive a pump under test and an encoder for providing a signal to said display apparatus indicative of the position of the drive shaft of the pump.

* * * * *